Figure 1:
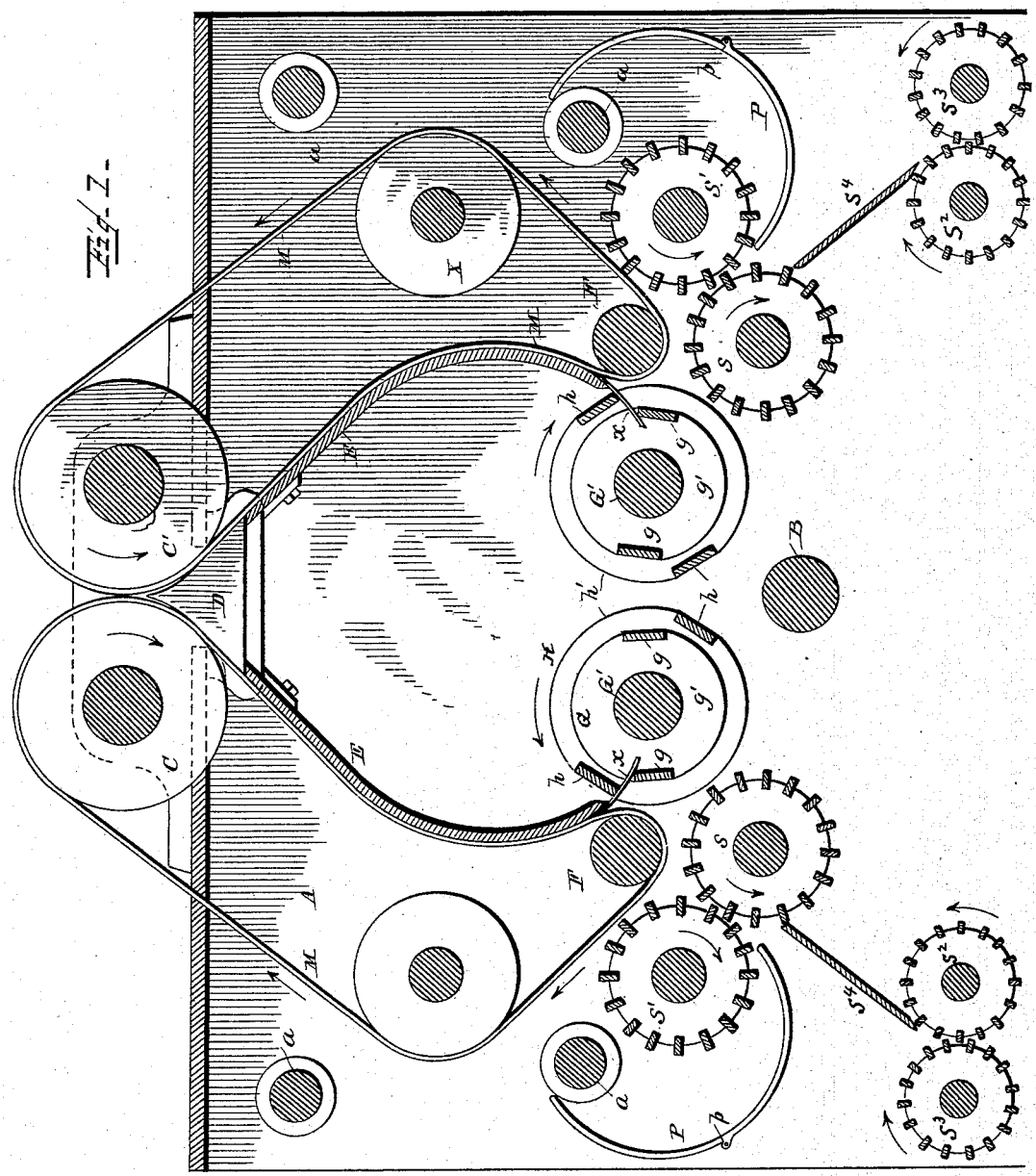

(No Model.)

J. J. GREEN.
MACHINE FOR TREATING HEMP, RAMIE, &c.

No. 388,665. Patented Aug. 28, 1888.

WITNESSES,
Edwin L. Yewell.
Ewell Asick.

INVENTOR,
J. J. Green.
by Marcellus Bailey
his Attorney.

UNITED STATES PATENT OFFICE.

JOSHUA J. GREEN, OF NEW YORK, N. Y.

MACHINE FOR TREATING HEMP, RAMIE, &c.

SPECIFICATION forming part of Letters Patent No. 388,665, dated August 28, 1888.

Application filed May 23, 1888. Serial No. 274,770. (No model.)

*To all whom it may concern:*

Be it known that I, JOSHUA J. GREEN, of the city, county, and State of New York, have invented certain new and useful Improvements in Machines for Treating Hemp, Ramie, &c., of which the following is a specification.

My invention has reference, mainly, to mechanism for separating and removing the pith of hemp, ramie, and other fibrous stalks from its fibrous integument. As preliminary to this operation it has been customary to split the stalk in two longitudinally, so as to expose its pithy interior, and afterward the split stalk on its pithy side has been acted on by a beater with a view to remove the pith. Both of these operations are performed in my machine; but to carry out the last-named operation I have devised a novel combination of instrumentalities by which the pith is presented to and acted on by the beater, by which the stalk is subjected to the pulling strain so necessary to strip the fibrous ribbon from the pith, and by which the ribbon is at the same time freed from its outer cuticle or coating of bark. I have also devised a novel form of beater which can be very effectively used as one of the elements of the said combination. In my machine I employ a feed-apron and a stationary guide-plate, between which and the apron the split stalk is conducted from the feed-rolls to the point where it is to be acted on by the beater. At or near this point is a breaker bar or roll, around which the stalk makes a sharp bend with the effect of breaking its comparatively brittle pith, the broken end of which will separate from the fiber and will project into the path of the rapidly-revolving beater. Beyond the breaker-bar is a pair of interlocking scraper-rolls, which travel somewhat faster than the feed-apron. The stalk passes between these scraper-rolls, which exert upon it the necessary pulling strain, and also act to free it of the outer coating of bark. These rolls thus serve in the double capacity of tension and of scraping rolls. The beater may be of any suitable construction. The most efficient form of beater for the purpose is one devised by myself, which I term, for convenience sake, a "compound beater," consisting of two beaters, one within the other, revolving at equal speed in opposite directions, and each consisting of two heads or end disks, with one or more cross-bars extending between the same. In practice I find that two beater-bars for each of the two beaters which make up the compound beater are sufficient and will give the best results. These bars are diametrically opposite each other, and the bars of the two beaters are so placed with relation to one another that the corresponding inner and outer bars of the two will meet and pass each other at the point where the pith from the stalk projects into the path of the compound beater. I thus obtain in effect a compound beater having two diametrically-opposite pairs of jaws, between which the projecting end of the pith is nipped and broken off. Except when the jaws momentarily meet and pass each other, the pith is free to project into the interior of the beater, which, save for its beater-bars, is entirely open on its periphery.

Figure 2:
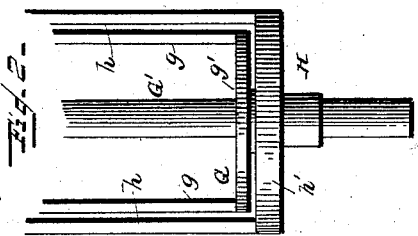

In the accompanying drawings, Figure 1 is a longitudinal vertical central section of a machine embodying my invention. Fig. 2 is a plan of a portion of the compound beater.

A is a supporting-frame, of any suitable construction, the sides of which are held together by cross-bars or tie-rods $a$. The power-driven parts of the mechanism derive their movement from a driving-shaft, B, through the intermediary of gearing which I have not deemed it necessary to represent. The direction of movement of the various instrumentalities is indicated by the arrows.

C C' are feed-rolls, (of, say, six inches in diameter,) power driven from shaft B, and D is the triangular splitting-knife between said rolls by which each stalk as it is fed along is split in two, the two halves passing down on opposite sides of the knife to the guide-plates E, which are on the prolongation of the base of the knife. The machine is a double machine, one half operating upon one half and the other upon the other half of the split stalk. A description of one-half of the machine therefore will answer for both.

At the lower end of guide-plate E is the breaker roll or bar F, (of, say, about two inches in diameter,) under and around which the split stalk (with its pith side toward the beater) is sharply bent.

M is the endless feed-apron. It passes from roll C, against the face of the guide-plate under the breaker bar or roll F, and thence up over the tightening idler-roll X back to roll C.

Beyond the breaker-bar F are the power-driven interlocking scraper-rolls S S'. They are armed on their periphery with longitudinal parallel and evenly-spaced steel blades, which interlock, as shown, and they are geared to travel with greater surface speed than the feed-apron.

Opposite the lower end of guide-plate E, and so placed that its nearest point of approach to the stalk is in the space intervening between the guide-plate and the breaker-bar F, is the compound beater G H. Beater H consists of two bars, $h$ $h$, extending between and secured at diametrically-opposite points to the periphery of end disks, $h'$ $h'$, which have a diameter of five inches, and are mounted to revolve loosely on shaft G'. Beater H, by gearing, is rotated at a rapid rate of speed in the direction of the arrow on one of the end disks, $h'$, its movement being in the same direction with that of the feed-apron. Beater G is constructed similarly to beater H and end disks, $g'$ $g'$, (of about four inches diameter,) and diametrically opposite bars $g$ $g$. It is placed within beater H, and is mounted upon and revolves with shaft G', which is power-driven from driving-shaft B, and rotates in a direction opposite to that in which the outer beater, H, revolves. The two oppositely-revolving beaters, which make up the compound beater, revolve at equal speed, and they are so placed with reference to one another and the guide-plate E and breaker-bar F that the corresponding bars of the two beaters will meet and pass one another at the point where the pith as it strips from the stalk will project into the path of the beater, as indicated in Fig. 1, where $x$ represents the butt end of the stalk projecting into the path of the compound beater.

The dimensions of the several parts of the compound beater may vary. In practice I have found that excellent results can be obtained with beater-bars one inch wide and one-fourth inch thick, the two beaters being so proportioned that the inner and outer bars when they meet will be, say, one-fourth of an inch apart, (more or less.)

When the machine is in operation, the split stalk is held firmly between the guide-plate and feed-apron, and is regularly fed toward the compound beater, which moves at much higher speed than the feed-apron; hence, when the first end or butt end of the stalk is presented to the beater and is nipped and broken by the bars $g$ $h$, (separated from each other by only one-fourth inch,) the outer bars, $h$, will incline and divert the ribbon of fiber freed from its pith downward and toward the scraper S, and as soon as the ribbon reaches this scraper the latter will lift and guide said ribbon to its companion scraper S'. In this way the ribbon finally is carried between the interlocking blades of the scrapers S S', and as these move faster than the feed-apron M the ribbon is subjected to that pulling strain so essential to strip it from its stalk or pith, and at the same time has its outer coating of bark removed by the sharp edges of the steel blades of scraper-roll S'.

In connection with the scraper-rolls I use a protector or shield, P, which at its lower end is adjusted close to the under side of roll S', and thence curves outward and upward, as seen. This shield is secured to the frame of the machine in a suitable manner. The workman usually stands in front of the scraper-rolls to receive the ribbons of fiber delivered by them, and the object of the shield is to protect the workman from the gummy particles of the coating, which, when scraped off from the fiber, will be thrown off by roll S' in its rapid revolution. The shield is divided in two horizontally, and the upper part is hinged at $p$ to the lower part to allow it to be turned down whenever the trough formed by the lower part of the shield is to be emptied of the gum and bark which it has caught.

The small or rear end of the split stalk when it travels past the point where it is held between the belt M and the guide-plate sometimes drops or falls before it can be acted upon by the beater, and thus a small portion of the pith may remain on this end of the ribbon after it passes the scraper-rolls S S'. To provide for this contingency, I place below and somewhat to the front of this set of scraper-rolls a second set, $S^2$ $S^3$, similarly constructed and driven, and between the two sets place an inclined guide-board, $S^4$. The workman having caught the butt or front ends of the ribbons as they come from the first set of interlocking scraper-rolls, S S', holds them in his hands and allows the small or rear ends as they pass from these rolls to drop down the guide-board to the lower set, $S^2$ $S^3$. By their revolution these ends of the ribbons are carried down between them, and then the operator draws back these ends through the rolls, thus scraping off from the small ends any pieces of pith or stalk which may still adhere. The guide-board is a convenience, but not a necessity; and as to the rolls $S^2$ $S^3$ themselves, while their employment in practice is desirable in order to insure perfect work, they nevertheless may be dispensed with without interfering with the co-operative action of the other elements of the machine.

Having described my invention and the manner in which the same is or may be carried into effect, what I claim, and desire to secure by Letters Patent, is—

1. The combination of the guide-plate, the feed-apron, the breaker bar or roll, the scraper-rolls, and the beater, substantially as and for the purposes hereinbefore set forth.

2. The combination of the guide-plate, the feed-apron, the breaker bar or roll, the beater, and the two sets of scraper-rolls S S' and $S^2$ $S^3$.

3. The combination of the feed-rolls, the splitting-knife, the feed-apron, the guide-plate, the breaker bar or roll, the scraper-rolls, and the beater, substantially as and for the purposes hereinbefore set forth.

4. The compound beater composed of the two beaters G H, the one within the other, rotating synchronously, but in opposite directions, substantially as and for the purposes hereinbefore set forth.

5. The compound beater composed of the two synchronously but oppositely-rotating beaters G H, the one within the other, in combination with the guide-plate, the feed-apron, the breaker bar or roll, and the scraper-rolls, substantially as and for the purposes hereinbefore set forth.

In testimony whereof I have hereunto set my hand.

J. J. GREEN.

Witnesses:
EWELL A. DICK,
MARVIN A. CUSTIS.